United States Patent
Wu

(10) Patent No.: US 7,978,392 B2
(45) Date of Patent: Jul. 12, 2011

(54) BI-STABLE DISPLAY DEVICE

(75) Inventor: San-Shien Wu, Tai Chung County (TW)

(73) Assignee: Wintek Corporation, Taichung (TW)

(*) Notice: Subject to any disclaimer, the term of this patent is extended or adjusted under 35 U.S.C. 154(b) by 0 days.

(21) Appl. No.: 12/723,316

(22) Filed: Mar. 12, 2010

(65) Prior Publication Data

US 2010/0232008 A1    Sep. 16, 2010

(30) Foreign Application Priority Data

Mar. 16, 2009   (TW) ................................ 98108531 A

(51) Int. Cl.
  *G02F 1/03*   (2006.01)
  *G02F 1/07*   (2006.01)
  *H01L 29/04*   (2006.01)
  *H01L 29/10*   (2006.01)
  *H01L 31/00*   (2006.01)

(52) U.S. Cl. .......................... 359/243; 359/254; 257/59

(58) Field of Classification Search .......... 359/290–292, 359/296, 298, 243, 259; 257/59, 72
See application file for complete search history.

(56) References Cited

U.S. PATENT DOCUMENTS

| | | | | |
|---|---|---|---|---|
| 5,978,138 A * | 11/1999 | Kang et al. | ..................... | 359/562 |
| 6,137,456 A * | 10/2000 | Bhagavatula et al. | ............ | 345/7 |
| 2003/0214475 A1 * | 11/2003 | Izumi et al. | ..................... | 345/87 |
| 2008/0158143 A1 * | 7/2008 | Kim et al. | ..................... | 345/107 |

* cited by examiner

*Primary Examiner* — Ricky L Mack
*Assistant Examiner* — Brandi N Thomas
(74) *Attorney, Agent, or Firm* — Muncy, Geissler, Olds & Lowe, PLLC

(57) ABSTRACT

A bi-stable display device including a first substrate, a thin film transistor (TFT) array layer and a bi-stable display panel is provided. The TFT array layer is formed on the first substrate and the bi-stable display panel is disposed on the TFT array layer. The first substrate includes at least two patterns with two predetermined ranges for respectively limiting the shift along a first axis and a second axis, and the first axis is perpendicular to the second axis.

17 Claims, 10 Drawing Sheets

BI-STABLE DISPLAY DEVICE

BACKGROUND OF THE INVENTION

1. Field of the Invention

The invention relates to a bi-stable display, and more particularly to an alignment structure of the bi-stable display.

2. Description of the Related Art

As the progress of the display technology, liquid crystal display (LCD) has been widely applied to various consumer-electronic products, such as cellular phones, portable computers, digital still cameras (DSC), portable navigation device (PND) and so on. However, the e-paper technology has been risen with respect to the requirement of thin package, low power consumption and long life time.

Take the electrophoretic display (EPD) developed by E-Ink company for instance, it includes a front plane laminate and a thin film transistor (TFT) array substrate wherein the front plane laminate includes a common electrode and a display layer. The display layer includes a plurality of microcapsules and charged black and white particles capable of being moving within the microcapsules by the voltage difference between the common electrode and a pixel electrode of the TFT array substrate to provide grayscale images. However, the inaccurate alignment between the front plane laminate and the TFT array substrate would result in inferior images and the entered moisture resulted from the package shift would decrease the yield rate.

Refer to FIG. 1 which illustrates a sectional view of the alignment structure of the electrophoretic display disclosed in the patent with published number TW 200628954. The electrophoretic display 100 includes a plurality of microcapsules 111 disposed on the upper substrate 110 wherein each microcapsule 111 is comprised of a side wall 112 and a seal layer 113 to hold the dielectric fluid 114 and multiple charged electrophoretic particles 115. The electrophoretic particles 115 are moved within the microcapsules 111 by the voltage difference between a common electrode 116 of the upper substrate 110 and a plurality of pixel electrodes 121 of the bottom substrate 120. With respect to the alignment structure, each side wall 112 on the upper substrate 110 has a first position structure 117 and the bottom substrate 120 has a second position structure 122 corresponding to the first position structure 117 thereby forming a complementary saw tooth configuration for the alignment of the electrophoretic display 100.

Nevertheless, the first position structure 117 and the second position structure 122 are formed through punching or rolling process such that the manufacturing cost would be increased. Therefore, providing an alignment structure with both alignment and inspection function based on the conventional process becomes the target of the present invention.

SUMMARY OF THE INVENTION

It is therefore an aspect of the present invention to provide a bi-stable display device with alignment patterns for inspection and alignment to increase the adhesion accuracy and yield.

It is another aspect of the present invention to provide a bi-stable display device wherein the alignment patterns are formed under the conventional manufacturing recipe without increasing additional step or cost.

In accordance with the foregoing aspect of the present invention, the bi-stable display device includes a first substrate, a thin film transistor (TFT) array layer and a bi-stable display panel, wherein the TFT array layer is formed on the first substrate and the bi-stable display panel is disposed on the TFT array layer. The first substrate includes at least two patterns with two predetermined ranges for respectively limiting the shift along a first axis and a second axis, and the first axis is perpendicular to the second axis.

In accordance with one embodiment of the alignment patterns of the present invention, the first substrate includes two patterns in the form of T-like configuration respectively corresponding to adjacent edges. One of the patterns includes a predetermined range for limiting the shift along a first axis (X axis), and another of the patterns includes a predetermined range for limiting the shift along a second axis (Y axis).

In accordance with another embodiment of the alignment patterns of the present invention, the first substrate includes two patterns in the form of L-like configuration respectively corresponding to two parallel corners. Each of the patterns includes two predetermined ranges for respectively limiting the shift along the first axis (X axis) and the second axis (Y axis).

Consequently, operators can position through the alignment patterns and determine the shift by inspecting the boundary of the bi-stable display falls into the predetermined ranges or not during the bi-stable display panel adhesion process such that the adhesion accuracy and the yield are both increased. Compared with the conventional position structure formed through punching or rolling process, the alignment patterns of the present invention is fabricated by modifying the pattern on the photo mask during photolithography process forming TFT array layer. Therefore, the alignment patterns of the present invention can be formed under the conventional manufacturing recipe without increasing additional step or cost.

DETAILED DESCRIPTION OF THE INVENTION

Figure 1:
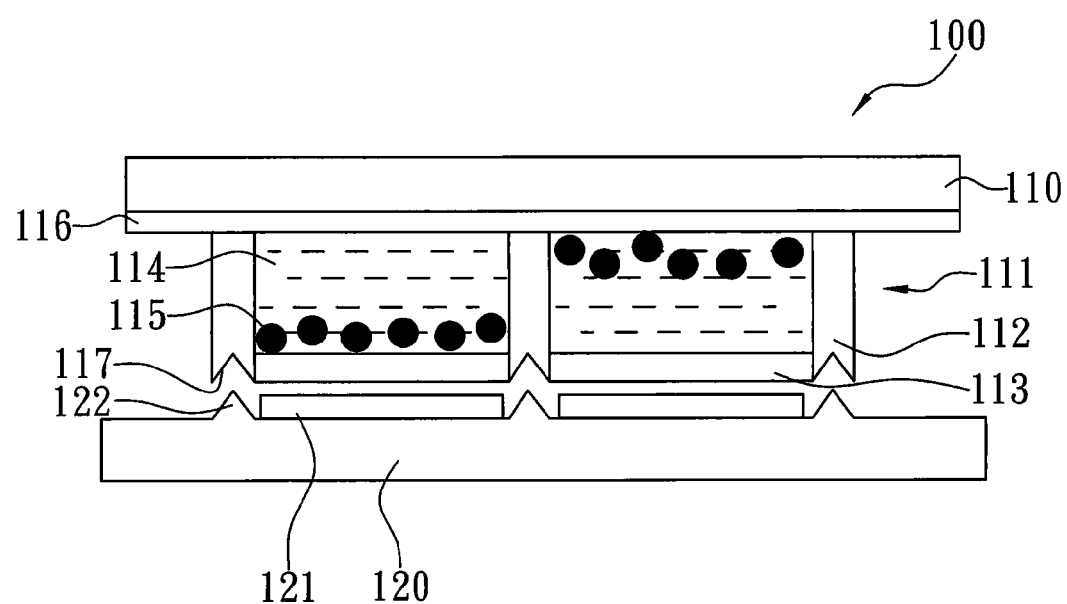
FIG. 1 is a sectional view of the alignment structure of the electrophoretic display disclosed in the patent with published number TW 200628954.
Figure 2:
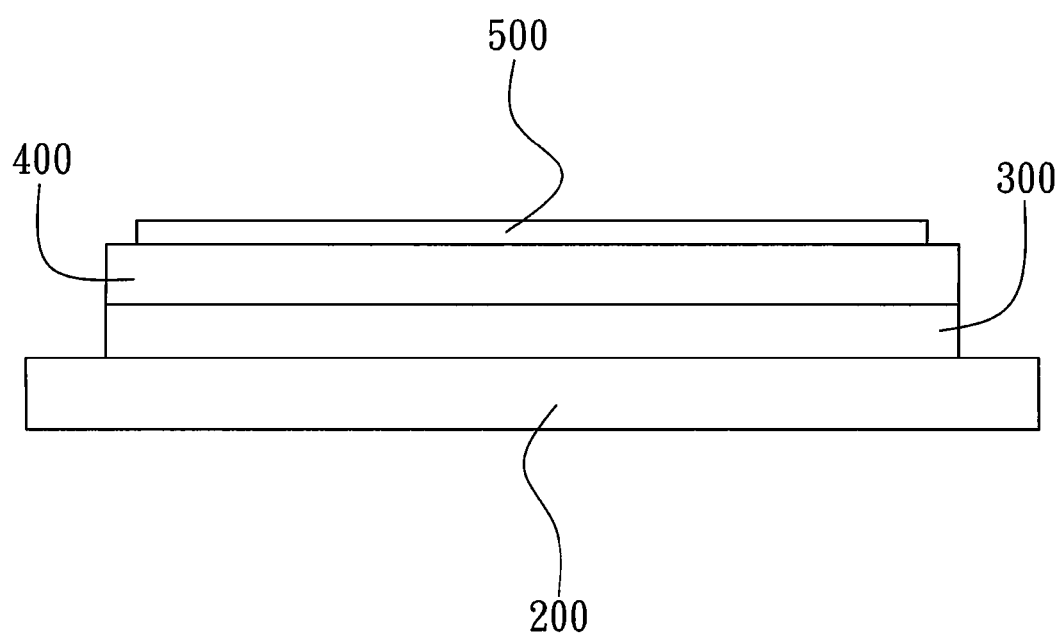
FIG. 2 is a schematic view of the bi-stable display device of the present invention.

Refer to FIG. 2 which illustrates a schematic view of the bi-stable display device of the present invention. The bi-stable display device includes a first substrate 200, a thin film transistor (TFT) array layer 300, a bi-stable display panel 400 and a protective film 500. The TFT array layer 300 is formed on the first substrate 200, the bi-stable display panel 400 is disposed on the TFT array layer 300 and the protective film 500 is set on the bi-stable display panel 400.

The TFT array layer 300 has a plurality of pixel electrodes. The bi-stable display panel 400 has a plurality of microcapsules, a medium and a common electrode wherein the medium is held within the microcapsules on which the common electrode is set. The pixel electrode, the medium and the common electrode are similar to the conventional structure, so there is no more detailed description. In addition, the medium can be composed of two kinds of charged dyed particles or a dielectric black fluid and multiple positive white particles.

Figure 3:
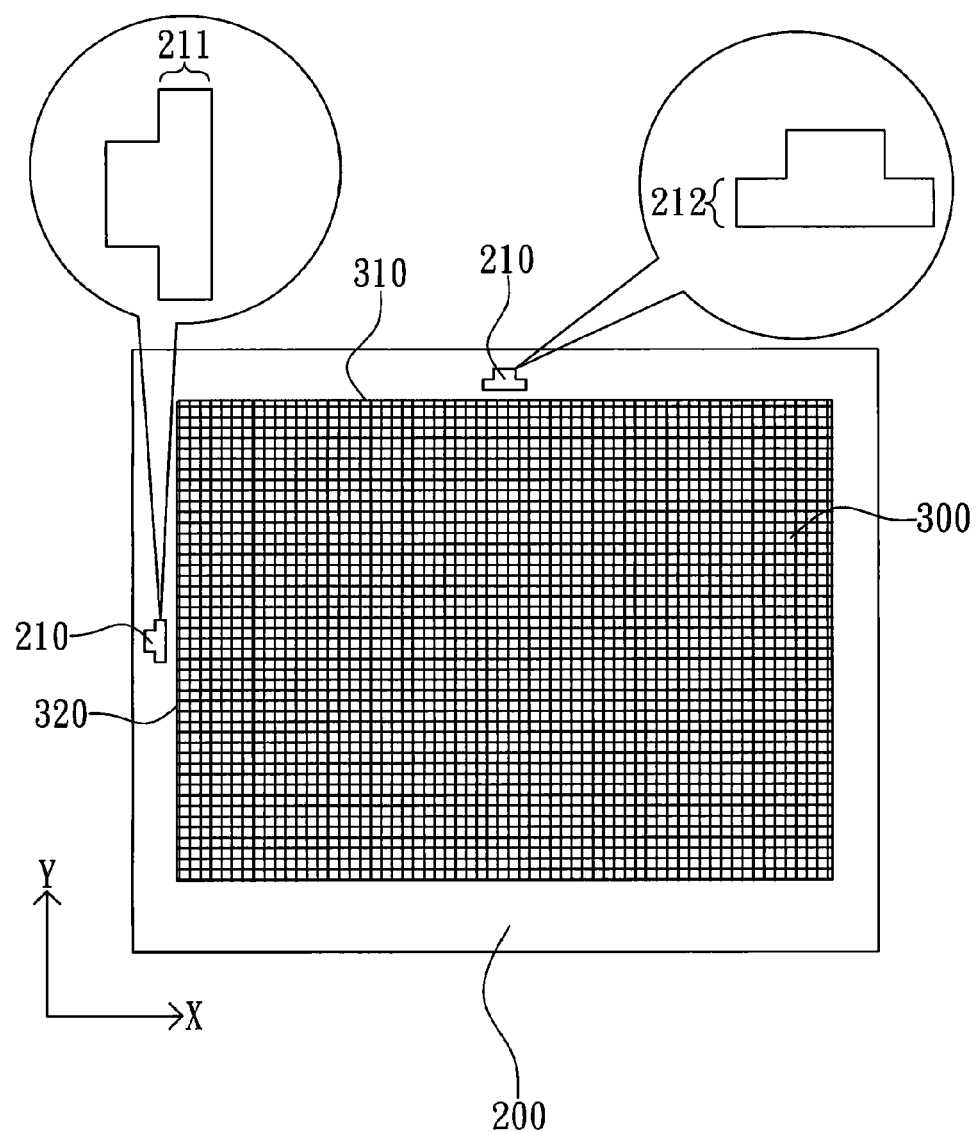
FIG. 3 is the first embodiment of the alignment patterns on the first substrate of the present invention.
Figure 4:
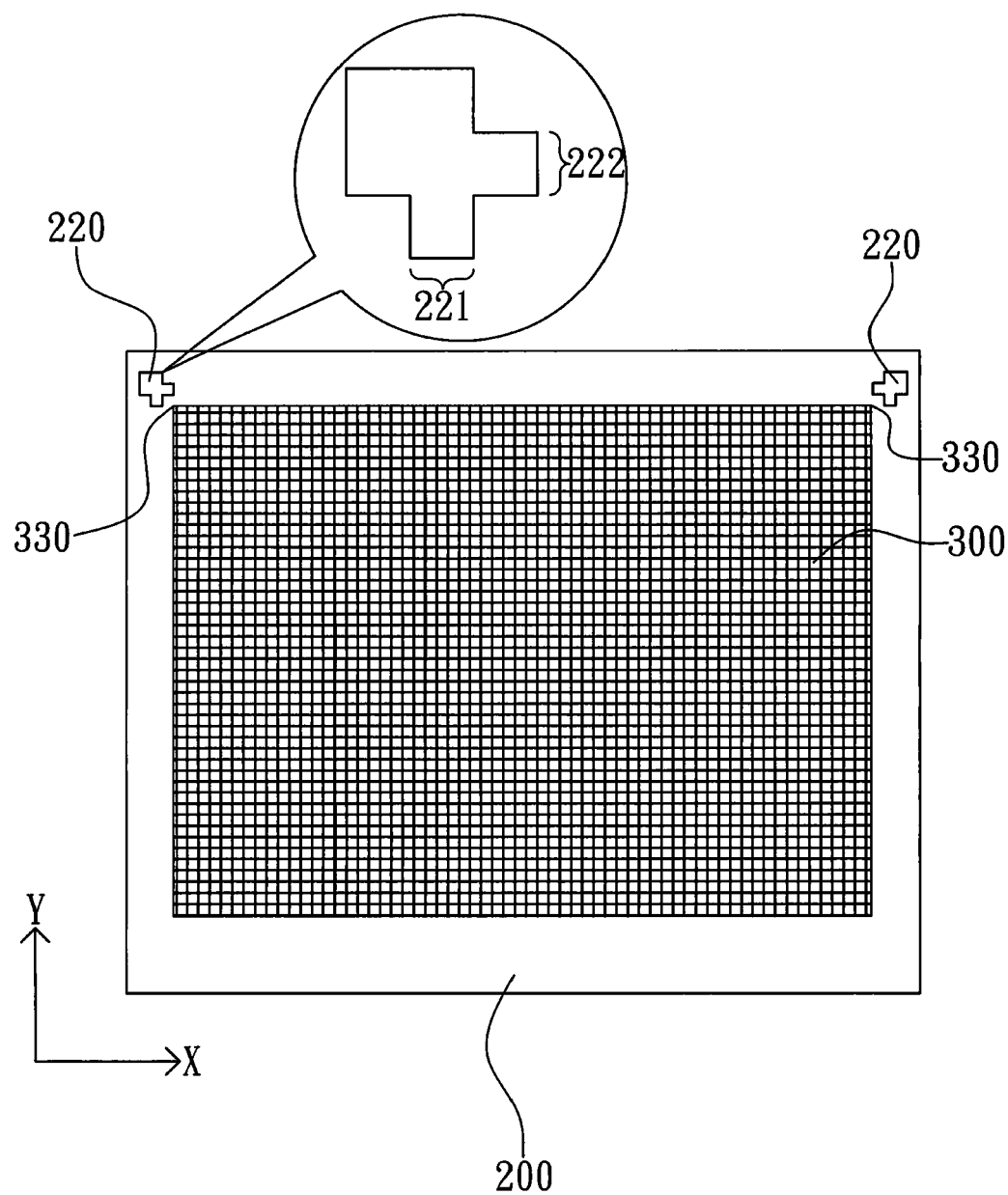
FIG. 4 is the second embodiment of the alignment patterns on the first substrate of the present invention.

Refer to FIG. 3 and FIG. 4 which respectively illustrate the embodiment of the alignment patterns formed on the first substrate 200.

In the first embodiment in FIG. 3, the first substrate 200 includes two patterns 210 in the form of T-like configuration respectively corresponding to adjacent edges 310 and 320 wherein the patterns 210 is manufactured through the photo mask during the thin film transistor array process. One of the patterns 210 includes a predetermined range 211 for limiting the shift along a first axis (X axis), and another of the patterns 210 includes a predetermined range 212 for limiting the shift along a second axis (Y axis) wherein the first axis is perpendicular to the second axis on the two dimensional surface of the first substrate 200.

In this embodiment of the present invention, the first substrate can be a glass substrate, PET substrate or stainless steel substrate.

In the second embodiment in FIG. 4, the first substrate 200 includes two patterns 220 in the form of L-like configuration respectively corresponding to two parallel corners 330 wherein the patterns 220 is manufactured through the photo mask during the thin film transistor array process. Each of the patterns 220 includes two predetermined ranges 221 and 222 for respectively limiting the shift along the first axis (X axis) and the second axis (Y axis).

Figure 5:
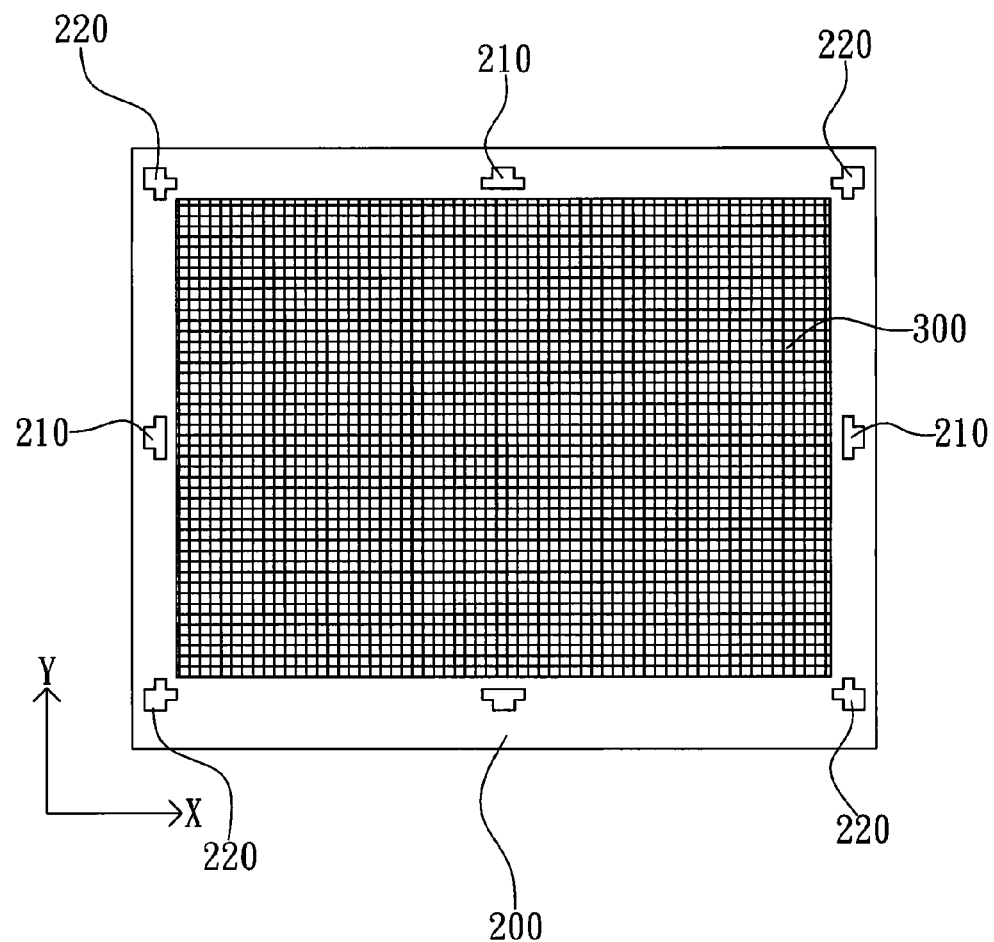
FIG. 5 is the third embodiment of the alignment patterns on the first substrate of the present invention.
Figure 6:
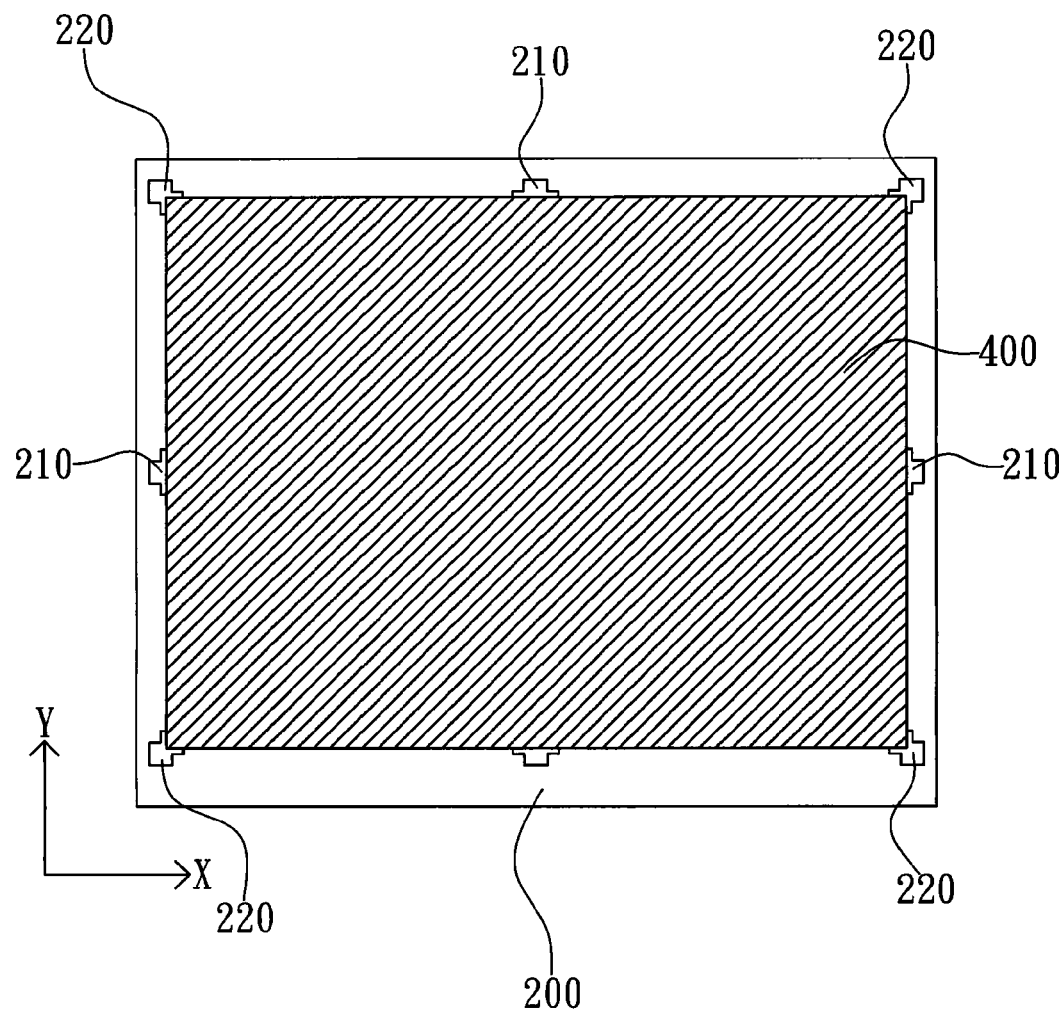
FIG. 6 is a schematic view of the bi-stable display panel after the alignment with the patterns.
Figure 7:
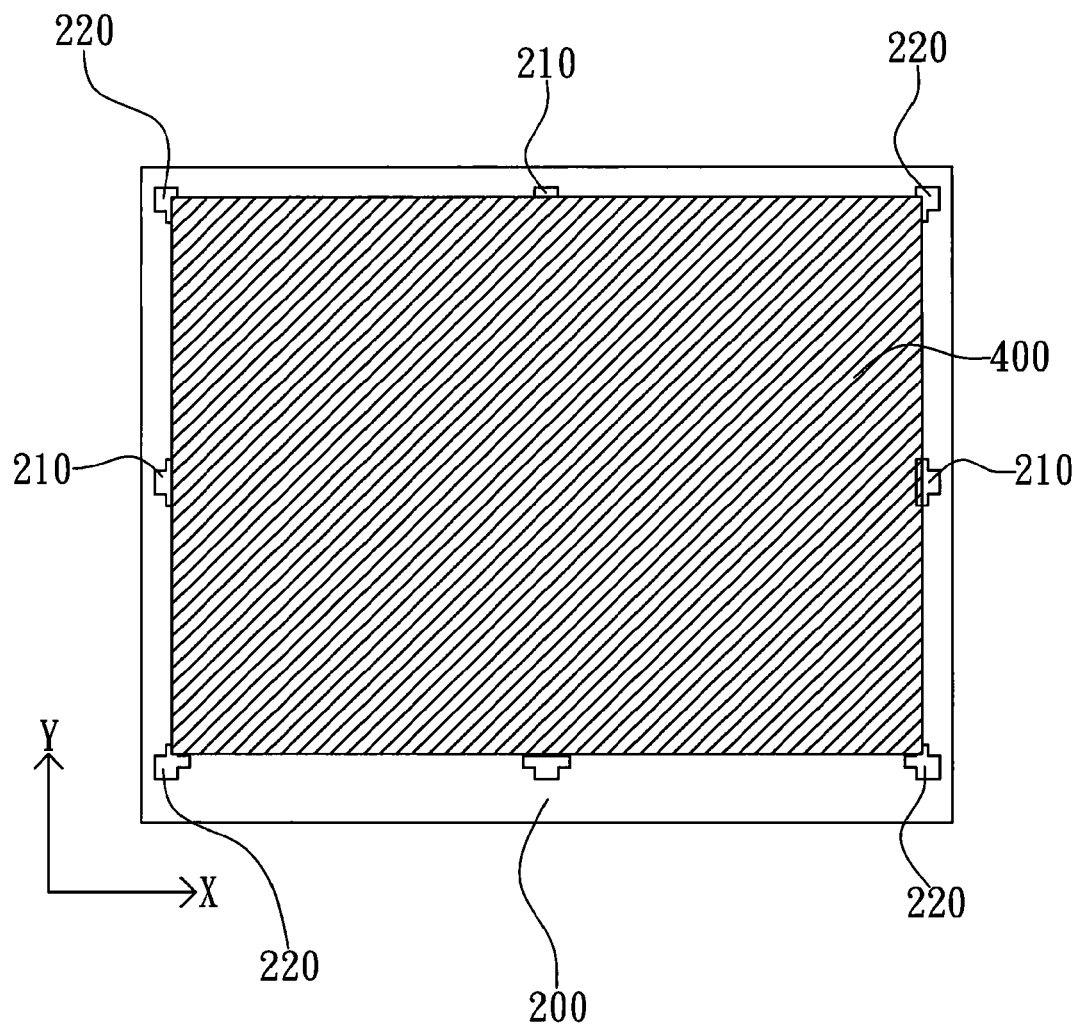
FIG. 7 is a schematic view showing the upward shift of the bi-stable display panel.
Figure 8:
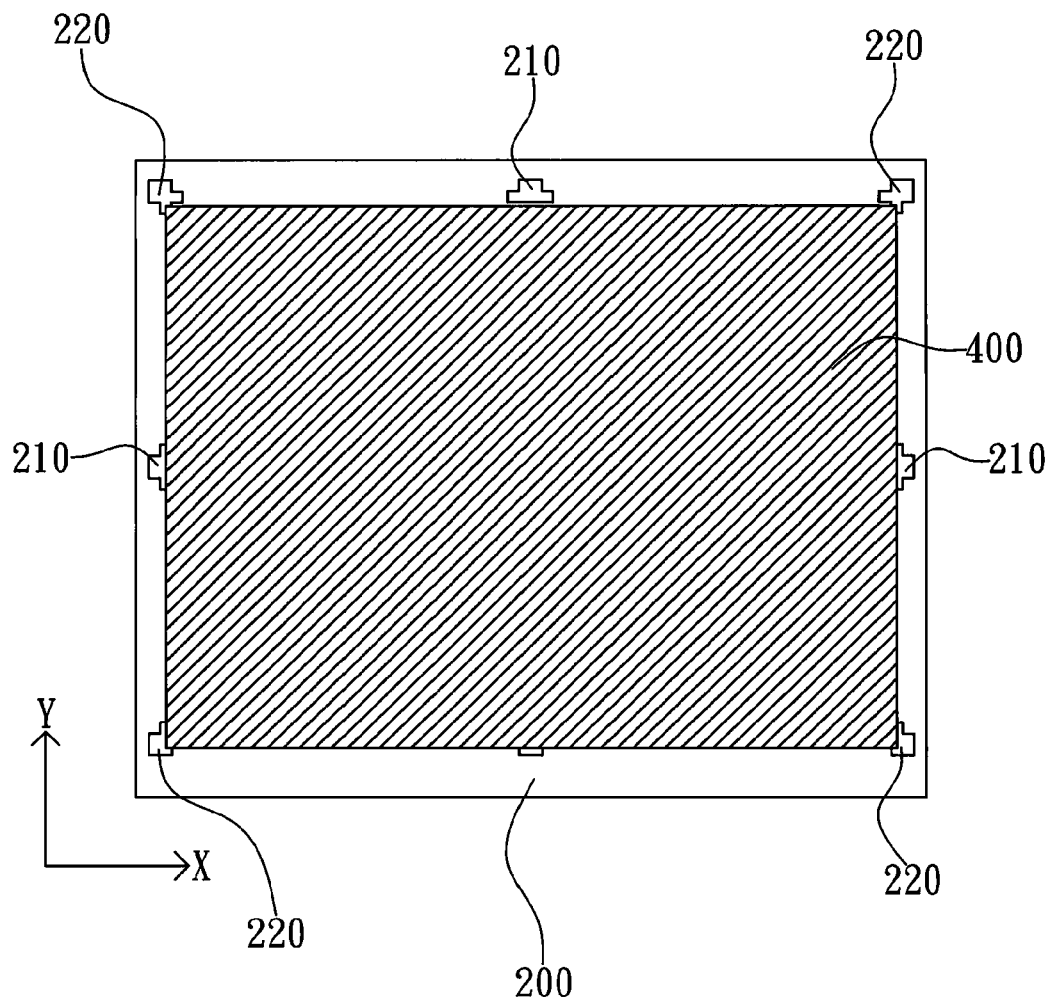
FIG. 8 is a schematic view showing the downward shift of the bi-stable display panel.
Figure 9:
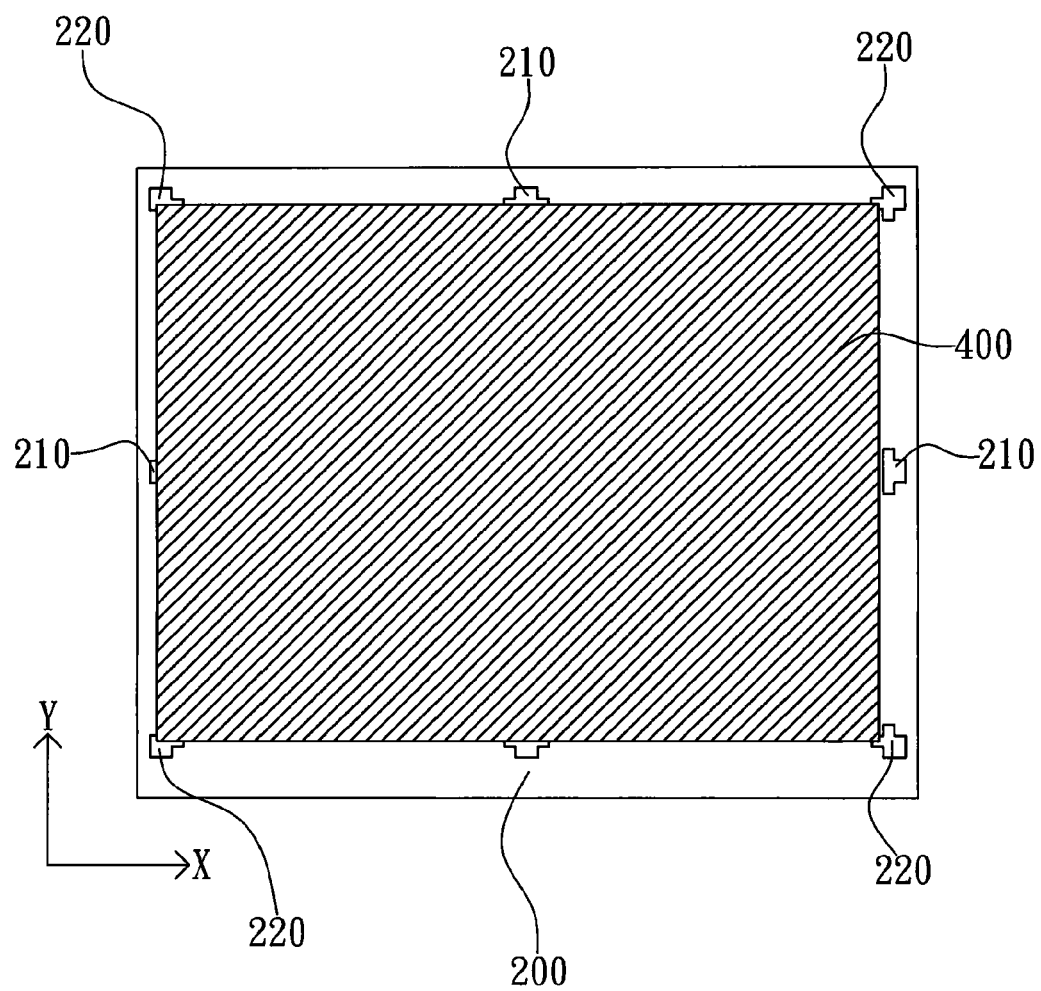
FIG. 9 is a schematic view showing the left shift of the bi-stable display panel.
Figure 10:
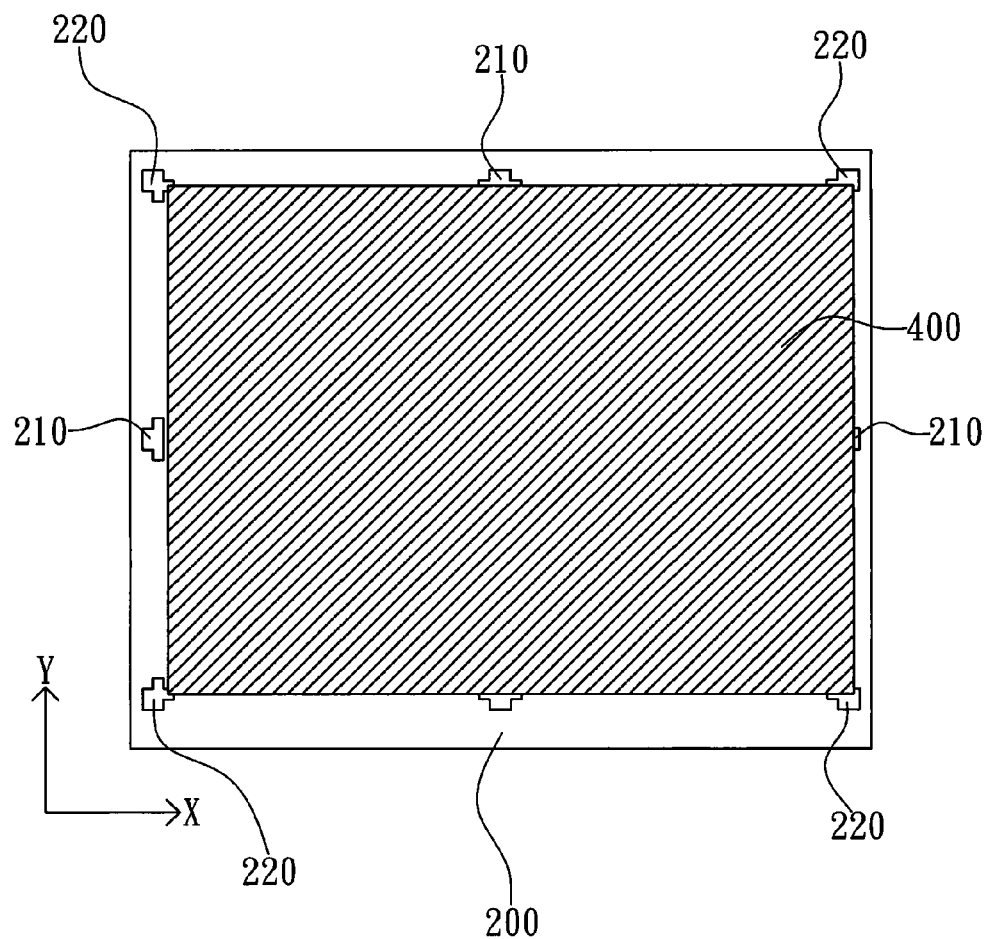
FIG. 10 is a schematic view showing the right shift of the bi-stable display panel.

Refer to FIG. 5 to FIG. 10. FIG. 5 illustrates a third embodiment of the alignment patterns formed on the first substrate 200; FIG. 6 to FIG. 10 illustrate various schematic views of the bi-stable display panel 400 after the alignment with the patterns.

In the third embodiment in FIG. 5, the first substrate 200 includes eight patterns of four T-like patterns 210 and four L-like patterns 220 respectively corresponding to edges and corners. During the adhesion process of the bi-stable display panel 400 through the eight patterns on the first substrate 200, the bi-stable display panel 400 is determined as an upward shift when it exceeds the predetermined ranges 212 or 222 of the lower T-like and L-like patterns along the second axis (Y axis) shown in FIG. 7; the bi-stable display panel 400 is determined as a downward shift when it exceeds the predetermined ranges 212 or 222 of the upper T-like and L-like patterns along the second axis (Y axis) shown in FIG. 8; the bi-stable display panel 400 is determined as a left shift when it exceeds the predetermined ranges 211 or 221 of the right T-like and L-like patterns along the first axis (X axis) shown in FIG. 9; the bi-stable display panel 400 is determined as a right shift when it exceeds the predetermined ranges 211 or 221 of the left T-like and L-like patterns along the first axis (X axis) shown in FIG. 10.

Therefore, the alignment patterns includes at least two patterns limiting the predetermined ranges along the first axis (X axis) and the second axis (Y axis), but not limit to the configuration or quantity disclosed in the above embodiment of FIG. 3, FIG. 4 and FIG. 5. Furthermore, the predetermined ranges are defined through the pattern of the photo mask during the photolithography and according to different alignment requirement of diverse products.

Consequently, operators can position through the alignment patterns 210 and 220 and determine the shift by inspecting the boundary of the bi-stable display 400 falls into the predetermined ranges 211, 212, 221 and 222 or not during the bi-stable display panel 400 adhesion process such that the adhesion accuracy and the yield are both increased. Compared with the conventional alignment structure formed through punching or rolling process, the alignment patterns of the present invention is fabricated by modifying the pattern on the photo mask during photolithography process forming TFT array layer 300. Therefore, the alignment patterns of the present invention can be formed under the conventional manufacturing recipe without increasing additional step or cost.

Although the present invention has been described in considerable detail with reference to certain preferred embodiments thereof, other embodiments are possible. Therefore, their spirit and scope of the appended claims should no be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A bi-stable display device, comprising:
a first substrate;
a thin film transistor array layer formed on the first substrate and comprising a plurality of pixel electrodes; and
a bi-stable display panel disposed on the thin film transistor array layer and comprising a medium and a common electrode, and the medium being sandwiched between the pixel electrodes and the common electrode;
wherein the first substrate comprises at least two patterns having two predetermined ranges for respectively limiting the shift along a first axis and a second axis, and the first axis is perpendicular to the second axis.

2. The bi-stable display device of claim 1, wherein the at least two patterns are formed during the TFT array layer process.

3. The bi-stable display device of claim 2, wherein the at least two patterns are formed corresponding to two adjacent edges of the TFT array layer.

4. The bi-stable display device of claim 2, wherein the at least two patterns are formed corresponding to two parallel corners of the TFT array layer.

5. The bi-stable display device of claim 3, wherein the at least two patterns are formed as T-like configuration.

6. The bi-stable display device of claim 5, wherein one of the at least two patterns comprises a predetermined range limiting the shift along the first axis and another of the at least two patterns comprises a predetermined range limiting the shift along the second axis.

7. The bi-stable display device of claim 4, wherein the at least two patterns are formed as L-like configuration.

8. The bi-stable display device of claim 7, wherein each of the at least two patterns comprises two predetermined ranges for respectively limiting the shift along the first axis and the second axis.

9. The bi-stable display device of claim 1, wherein the first substrate comprises eight patterns.

10. The bi-stable display device of claim 1, further comprising a protective film set on the bi-stable display panel.

11. The bi-stable display device of claim 1, wherein the first substrate is a glass substrate.

12. The bi-stable display device of claim 1, wherein the first substrate is a PET substrate.

13. The bi-stable display device of claim 1, wherein the first substrate is a stainless steel substrate.

14. The bi-stable display device of claim 1, wherein the bi-stable display panel comprises a plurality of microcapsules holding the medium.

15. The bi-stable display device of claim 14, wherein the medium comprises a plurality of charged dyed particles.

16. The bi-stable display of claim 15, wherein the charged dyed particles comprise negative black particles and positive white particles.

17. The bi-stable display of claim 14, wherein the medium comprises a dielectric black fluid and multiple positive white particles.

* * * * *